United States Patent
Wang et al.

(10) Patent No.: US 12,012,912 B2
(45) Date of Patent: Jun. 18, 2024

(54) SYSTEM DEVICE FOR STRATIFIED INJECTING EXHAUST GAS RECIRCULATION FOR CLEAN COMBUSTION OF INTERNAL COMBUSTION ENGINE

(71) Applicant: Tianjin University, Tianjin (CN)

(72) Inventors: Tianyou Wang, Tianjin (CN); Tianlong Lu, Tianjin (CN); Zhen Lu, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/169,141

(22) Filed: Feb. 14, 2023

(65) Prior Publication Data

US 2023/0193859 A1  Jun. 22, 2023

Related U.S. Application Data (63) Continuation of application No. PCT/CN2021/088945, filed on Apr. 22, 2021.

(30) Foreign Application Priority Data

Dec. 24, 2020  (CN) .......................... 202011548321.7

(51) Int. Cl.
*F02M 26/07* (2016.01)
*F02B 25/02* (2006.01)
(Continued)

(52) U.S. Cl.
CPC ............. *F02M 26/07* (2016.02); *F02B 25/02* (2013.01); *F02M 26/09* (2016.02); *F02M 26/16* (2016.02);
(Continued)

(58) Field of Classification Search
CPC ........ F02M 26/07; F02M 26/09; F02M 26/16; F02M 26/20; F02M 26/23; F02M 26/34;
(Continued)

(56) References Cited

U.S. PATENT DOCUMENTS

| 10,907,557 B2 | 2/2021 | Kim |
| 2014/0060013 A1* | 3/2014 | Dunn .................... F01K 23/068 60/278 |

(Continued)

FOREIGN PATENT DOCUMENTS

| CN | 202789149 U | 3/2013 |
| CN | 106555710 A | 4/2017 |

(Continued)

OTHER PUBLICATIONS

Internation Search Report of PCT/CN2021/088945, Mailed Jun. 24, 2021.

*Primary Examiner* — Deming Wan (57) ABSTRACT

Disclosed are two system devices for stratified injecting the recirculated exhaust gas and high-specific-heat-capacity or inert gas for clean combustion of an internal combustion engine. The former is composed of an exhaust gas recirculation system, an injection system, and a power system. The latter is composed of four parts, and a high-specific-heat-capacity gas or inert gas channel is added. Injectors can be arranged at any position in the cylinder between a top dead center and a bottom dead center of a piston in a cylinder; 1-3 layers of injectors can be arranged; and 2-6 injectors can be arranged on each layer. Gas participating in combustion enters the cylinder from two intake channels, namely, a scavenging port of the internal combustion engine and the injectors; an in-cylinder swirl ratio can be remarkably increased through kinetic energy carried by the gas; and fuel-gas mixing is promoted, and the combustion rate is increased.

10 Claims, 3 Drawing Sheets

(51) Int. Cl.
*F02M 26/09* (2016.01)
*F02M 26/16* (2016.01)
*F02M 26/20* (2016.01)
*F02M 26/23* (2016.01)
*F02M 26/34* (2016.01)
*F02M 26/35* (2016.01)
*F02M 26/37* (2016.01)
*F02M 26/38* (2016.01)
*F02M 26/39* (2016.01)

(52) U.S. Cl.
CPC ............ *F02M 26/20* (2016.02); *F02M 26/23* (2016.02); *F02M 26/34* (2016.02); *F02M 26/35* (2016.02); *F02M 26/37* (2016.02); *F02M 26/38* (2016.02); *F02M 26/39* (2016.02)

(58) Field of Classification Search
CPC ........ F02M 26/35; F02M 26/37; F02M 26/38; F02M 26/39; F02B 25/02
See application file for complete search history.

(56) References Cited

U.S. PATENT DOCUMENTS

| | | |
|---|---|---|
| 2014/0123968 A1 | 5/2014 | Farman et al. |
| 2014/0144413 A1 | 5/2014 | Pierik et al. |
| 2015/0260120 A1* | 9/2015 | Prumm ............... F02M 35/1038 123/542 |
| 2022/0145834 A1* | 5/2022 | Schickler ............... F02M 26/35 |
| 2023/0203971 A1* | 6/2023 | Bick .................... F01M 13/028 123/572 |

FOREIGN PATENT DOCUMENTS

| | | |
|---|---|---|
| CN | 109184962 A | 1/2019 |
| CN | 109519305 A | 3/2019 |
| WO | 2018080534 A1 | 5/2018 |

* cited by examiner

SYSTEM DEVICE FOR STRATIFIED INJECTING EXHAUST GAS RECIRCULATION FOR CLEAN COMBUSTION OF INTERNAL COMBUSTION ENGINE

CROSS-REFERENCE TO RELATED APPLICATIONS

This application is a continuation of International Patent Application No. PCT/CN2021/088945 with a filing date of Apr. 22, 2021, designating the United States, now pending, and further claims priority to Chinese Patent Application No. 202011548321.7 with a filing date of Dec. 24, 2020. The content of the aforementioned applications, including any intervening amendments thereto, are incorporated herein by reference.

TECHNICAL FIELD

The present invention belongs to the structure technology of an internal combustion engine and particularly relates to a device for injecting the recirculated exhaust gas to achieve in-cylinder clean combustion of a marine internal combustion engine.

BACKGROUND OF THE PRESENT INVENTION

The key indicators of a low-speed marine engine as core equipment of a ship, such as reliability, economy, and environmental friendliness directly determine the operating costs of ocean transportation and the level of global pollution emissions. Tier III emission standards implemented since Jan. 1, 2016 are stricter than Tier II standards, and the NOx emissions must be reduced by 75%. Therefore, the primary development direction of the low-speed marine engine is to improve the fuel economy on the basis that the Tier III emission limit is met. At present, the main technology to meet the Tier III emission limit is a homogeneous exhaust gas recirculation (EGR) technology. EGR is an effective way for reducing the pollution of exhaust gas emission to the environment, and its principle is to introduce part of high-temperature exhaust gas generated by engine combustion into an intake port after cooling, then mix the part of high-temperature exhaust gas with the fresh intake air, and the mixture enters the cylinder to participate in subsequent combustion. With the EGR technology, the oxygen content of mixed gas in the cylinder is reduced and the highest combustion temperature is reduced, thereby achieving the purpose of reducing NOx pollutants in the exhaust gas and reducing the emission. However, the overall in-cylinder combustion chemical reaction rate will be reduced through the introduction of homogeneous recirculated exhaust gas, the thermal efficiency of the internal combustion engine is reduced, and fuel consumption is increased. Taking a container ship with a loading capacity of ten thousand containers as an example, the fuel cost of 1.5 million RMB is increased by every 1 g/kW·h increase in fuel consumption. To solve the problem, the present invention develops a device capable of directly injecting the recirculated exhaust gas into the cylinder to achieve in-cylinder stratified control combustion, and the fuel consumption can be reduced on the basis that the Tier III emission limit is met.

SUMMARY OF PRESENT INVENTION

A purpose of the present invention is to provide a system device for stratified injecting the recirculated exhaust gas for clean combustion of an internal combustion engine, which realizes efficient clean combustion of the internal combustion engine and can greatly improve combustion and emission performance of the internal combustion engine. The present invention may relate to a charge regulation technology and an injection system of four-stroke, two-stroke, and dual-fuel internal combustion engines.

The present invention includes two devices, i.e., a system for stratified injecting the recirculated exhaust gas and a system for stratified injecting the high-specific-heat-capacity and inert gas for clean combustion of the internal combustion engine, and the second device further includes a stratified injection system of fresh air.

In the present invention, to realize a stratified injection mode, an injector is additionally arranged on an upper part (a position corresponding to a piston when an exhaust valve is mostly closed or totally closed) of a cylinder in a conventional marine diesel engine, and the cylinder is provided with two intake ports, namely the injector positioned on the upper part of the cylinder and a scavenging port positioned at a lower part of the cylinder.

The principles and technical solutions for injecting recirculated exhaust gas are illustrated as follows. The Chinese definition of IEGR is Injected Exhaust Gas Recirculation.

(1) The technical solution of the system device for stratified injecting recirculated exhaust gas for clean combustion of the engine is illustrated first. The device includes a turbine, a gas compressor, control valves, an exhaust manifold, a scavenging manifold, an intercooler, an exhaust gas filter, a water vapor collector, a booster pump, a pressure stabilizing tube, a pressure sensor, an injector, bypass valves, a condenser, and an internal combustion engine. The internal combustion engine includes a cylinder, fuel injectors, and a scavenging port. According to the technical solution, the whole device is composed of three parts, wherein a first bypass valve, a first control valve, the intercooler, the exhaust gas filter, and the water vapor collector are sequentially connected, and an outlet of a second bypass valve is connected between the first bypass valve and the first control valve in parallel to form an exhaust gas recirculation system channel. An exhaust gas recirculation injection system channel is formed by sequentially connecting the booster pump, the pressure stabilizing tube, the pressure sensor, a second control valve and the injector in the internal combustion engine. According to the structure of a power system, an outlet of the exhaust manifold is connected to an inlet of the turbine, the turbine is coaxially connected to the gas compressor, an outlet of the gas compressor is connected to the condenser, the condenser is connected with the scavenging manifold, and an outlet of the scavenging manifold is connected to the scavenging port in the internal combustion engine. Exhaust gas from the internal combustion engine is directed to the exhaust manifold, part of the exhaust gas at a rear end of the turbine is discharged into the atmosphere, and part of the exhaust gas is directed to the first bypass valve. The outlet of the exhaust manifold is connected to the inlet of the turbine in parallel and then connected to an inlet of the second bypass valve through a pipeline.

The principle of the system device for stratified injecting recirculated exhaust gas is that: firstly the maximum limit of IEGR rate of the recirculated exhaust gas is controlled through the first control valve; then the recirculated exhaust gas is cooled to reach intake temperature through the intercooler; then the recirculated exhaust gas enters the exhaust gas filter to filter impurities which will corrode an exhaust gas recirculation system and the booster pump; and then the exhaust gas enters the water vapor collector which is capable of absorbing supersaturated water drops in the exhaust gas. An IEGR system is that the exhaust gas containing saturated water vapor at the corresponding intake temperature passes through the booster pump, the recirculated exhaust gas is pressurized to increase the gas flow, and the recirculated exhaust gas is injected into the cylinder within the set injection duration, and the pressurized recirculated exhaust gas enters the pressure stabilizing tube (having a cooling function), and the gas subjected to pressure stabilizing and cooling to reach the intake temperature enters the injector through the second control valve. The booster pump cooperates with the pressure sensor and the IEGR injector to accurately control the IEGR rate, the exhaust gas subjected to operation treatment finally enters the cylinder through the IEGR injector, and the exhaust gas and fresh air entering from the scavenging port will form the IEGR stratification in the cylinder, thus participating in subsequent combustion.

The recirculated exhaust gas comes from two routes. 1) In the first route, the first bypass valve is opened, and the second bypass valve is closed; part of the exhaust gas from the outlet of the turbine is directly discharged into the atmosphere, and part of the exhaust gas is introduced into the IEGR channel through the first bypass valve; in the second route, the first bypass valve is closed, and the second bypass valve is opened; part of the exhaust gas enters the turbine drive power system, and part of the exhaust gas is introduced into the IEGR channel through the second bypass valve. 2) The recirculated exhaust gas sequentially passes through the first control valve, the intercooler, the exhaust gas filter, and the water vapor collector to enter the booster pump, then enters the pressure stabilizing tube after being pressurized, then enters the IEGR injector through the second control valve, and finally is directly injected into the cylinder to form IEGR stratification, to participate in subsequent combustion.

The stratified injection of the recirculated exhaust gas has the advantages:

1) the exhaust gas after combustion in the cylinder is directly injected into the cylinder through the IEGR system channel; and under the guide role of a wall surface of the cylinder, the kinetic energy carried by the exhaust gas can significantly increase the in-cylinder swirl ratio, thereby promoting fuel-air mixing and accelerating the combustion rate; 2) stratification of fresh intake gas and the recirculated exhaust gas in the cylinder can be achieved through the device, and the stratification includes concentration stratification and temperature stratification (concentration stratification: fresh air entering from the scavenging port is mainly distributed in the center of the cylinder, and the recirculated exhaust gas is mainly distributed near the wall surface of the cylinder; temperature stratification: the temperature of the recirculated exhaust gas after cooling is relatively low, and the specific heat capacity of the recirculated exhaust gas is high, so that the temperature of a cylinder wall side area is lower than that of a center area at the end of the compression process). On the one hand, the form of the recirculated exhaust gas distributed on the wall surface of the cylinder can effectively form a gas heat insulation layer, which can reduce the heat transfer loss of the cylinder wall surface; on the other hand, the main generation area of nitrogen oxide is near the wall surface of the cylinder, and the generation of the nitrogen oxide can be effectively inhibited through the distribution form of the recirculated exhaust gas on the wall surface of the cylinder.

The device in the present invention can also inject other gases besides recirculated exhaust gas, and therefore a system for stratified injection of high-specific-heat-capacity and inert gases is developed (including a system for stratified injection of fresh air).

(2) The technical solution of the stratified injection system device of high-specific-heat-capacity and inert gas for clean combustion of the internal combustion engine is illustrated as follows. The system device includes a gas storage device, control valves, a water vapor collector, a booster pump, a pressure stabilizing tube, a pressure sensor, an exhaust manifold, a turbine, a gas compressor, a condenser, a scavenging manifold, an exhaust manifold and an internal combustion engine. The internal combustion engine includes the cylinder, fuel injectors, and a scavenging port. According to the technical solution, the whole device is composed of four parts, wherein the gas storage device is connected with a third control valve to form a high-specific-heat-capacity gas or inert gas channel; a fourth control valve is connected with the water vapor collector to form a fresh air intake channel; an injection system channel is formed by sequentially connecting the booster pump, the pressure stabilizing tube, the pressure sensor, the second control valve and the injector in the internal combustion engine. According to the structure of a power system, the outlet of the exhaust manifold is connected to the inlet of the turbine, the turbine is coaxially connected to the gas compressor, the outlet of the gas compressor is connected to the condenser, the condenser is connected with the scavenging manifold, the outlet of the scavenging manifold is connected to the scavenging port in the internal combustion engine, exhaust gas from the internal combustion engine is directed to the exhaust manifold, and exhaust gas at the rear end of the turbine is discharged into the atmosphere.

One of the main innovations of the present invention is that to achieve different IEGR rates or high-specific-heat-capacity and inert gas injection, the position of the injector can be selected to be any position in the cylinder between the top dead center and the bottom dead center of the piston; 1-3 layers of the injectors can be arranged; 2-6 injectors can be arranged in each layer, and the injectors are evenly distributed in the circumferential direction. The closer the position of the injector is to a cylinder head, the shorter the mixing time of recirculated exhaust gas and fresh intake gas is, the more obvious stratification is, and meanwhile, the smaller the swirl ratio attenuation is.

The principle of injection of high-specific-heat-capacity gas is that high-specific-heat-capacity gas such as $CO_2$ and $H_2O$ in the gas storage device enters the booster pump through the third control valve, the high-specific-heat-capacity gas is pressurized to increase the gas flow, and thus the to-be-injected high-specific-heat-capacity gas is injected into the cylinder within a set injection duration; the pressurized high-specific-heat-capacity gas enters the pressure stabilizing tube, and the gas which is stabilized in pressure and cooled to reach the intake temperature enters the injector in the cylinder through the second control valve. The booster pump cooperates with the pressure sensor and the injector to accurately control the flow rate and stratification effect of the high-specific-heat-capacity gas, the high-specific-heat-capacity gas subjected to operation treatment finally enters the cylinder through the injector, the high-specific-heat-capacity gas and fresh air entering from the scavenging port form component stratification in the cylinder to realize temperature stratification, and further to participate in subsequent combustion.

The principle of injection of inert gas is that the inert gas in the gas storage device enters the booster pump through the third control valve, the inert gas is pressurized to increase the gas flow, and thus the to-be-injected inert gas is injected into the cylinder within the set injection duration, and the pressurized inert gas enters the pressure stabilizing tube, and the inert gas which is subjected to pressure stabilizing and cooled to reach intake temperature enters the injector in the cylinder through the second control valve. The booster pump cooperates with the pressure sensor and the injector to accurately control the flow and the stratification effect of the inert gas; the inert gas subjected to operation treatment finally enters the cylinder through the injector, and forms component stratification in the cylinder with fresh air entering from the scavenging port; then temperature stratification is achieved; and meanwhile, the oxygen concentration can be reduced, the highest combustion temperature is reduced by restraining the combustion rate, and thus NOx generation is restrained.

The principle of injection of fresh air is that the fresh air containing supersaturated water passes through a fourth control valve and then passes through the water vapor collector which is capable of absorbing supersaturated water drops in the fresh air; the fresh air containing saturated water vapor at the corresponding air intake temperature passes through the booster pump, the fresh air is pressurized to increase the gas flow, and thus the fresh air can be injected into the cylinder within the set injection duration, and the pressurized fresh air enters the pressure stabilizing tube, and the air which is subjected to pressure stabilizing and cooled to reach the air intake temperature enters the injector in the cylinder through the second control valve. The booster pump cooperates with the pressure sensor and the injector to accurately control the fresh air flow and the stratification effect; the fresh air subjected to operation treatment finally enters the cylinder through the injector; and forms gas stratification in the cylinder with the fresh air entering from the scavenging port; and then temperature stratification and concentration stratification are formed, to participate in subsequent combustion.

The stratified injection system device of high-specific-heat-capacity gas and inert gas has the advantages:

(1) The high-specific-heat-capacity gases such as $CO_2$ and $H_2O$ (water vapor) are injected; the factors for inhibiting the generation of NOx (nitrogen oxide) in the combustion process of IEGR are mainly heat effect and dilution effect, which are the effects of $CO_2$ and $H_2O$ components in the recirculated exhaust gas; and the high-specific-heat-capacity characteristic of the three-atom molecules can reduce the highest combustion temperature to inhibit the generation of NOx. Generally, the mass fractions of $CO_2$ and $H_2O$ in the exhaust gas are relatively low; if the injection of the recirculated exhaust gas is changed into the direct injection of high-specific-heat-capacity gases such as $CO_2$ and $H_2O$, the total injection amount of the gas can be greatly reduced while meeting the Tier III emission standards; and the load of the booster pump is reduced.

(2) The inert gases such as $N_2$ (nitrogen) and Ar (argon) are injected; the oxygen concentration can be reduced while realizing temperature stratification of the inert gases and the gas in the cylinder; and the highest combustion temperature is reduced by inhibiting the combustion rate to inhibit the generation of NOx.

(3) The fresh air is injected. On the one hand, the purpose of reducing NOx is achieved through the temperature stratification of the injected fresh air and the gas in the cylinder, and on the other hand, the later oxidation of soot can be promoted by increasing the oxygen content, and the emission is reduced.

The present invention has the characteristics and the beneficial effects that the cylinder structure of the internal combustion engine does not need to be greatly changed; and utilizing stratified injection of the recirculated exhaust gas, high-specific-heat-capacity gas, inert gas or fresh air, the defects caused by the homogeneous EGR technology when meeting the nitrogen oxide emission of the internal combustion engine are overcome, and the fuel economy is reduced. The device of the present invention can meet the Tier III emission limit and can reduce fuel consumption at the same time. By injecting the fresh gas, soot emission can be reduced, and meanwhile, the trade-off relationship among soot, fuel consumption, and nitrogen oxide is improved.

DETAILED DESCRIPTION OF PREFERRED EMBODIMENTS

The structural device of the present invention is further illustrated below in conjunction with the accompanying drawings and through specific embodiments.

Figure 1:
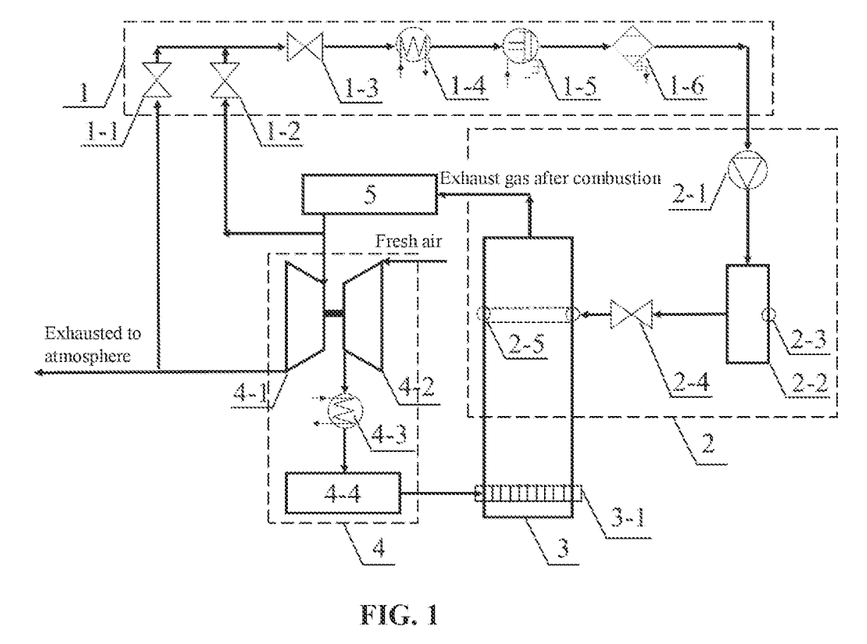
FIG. 1 is a principle and structural system diagram of all components of a stratified injection system device of recirculated exhaust gas.

(1) A system device for stratified injecting recirculated exhaust gas for clean combustion of an internal combustion engine (as shown in FIG. 1) is structurally composed of three parts, wherein 1) a first bypass valve 1-1, a first control valve 1-3, an intercooler 1-4, an exhaust filter 1-5 and a water vapor collector 1-6 are sequentially connected, and a second bypass valve outlet 1-2 is connected between the first bypass valve and the first control valve in parallel, to form an exhaust gas recirculation system channel 1; 2) an exhaust gas recirculation injection system channel 2 is formed by sequentially connecting a booster pump 2-1, a pressure stabilizing tube 2-2, a pressure sensor 2-3, a second control valve 2-4 and an injector 2-5 in the internal combustion engine 3; and 3) in the structure of a power system 4, an outlet of an exhaust manifold 5 is connected to an inlet of a turbine 4-1, the turbine is coaxially connected with a gas compressor 4-2, and an outlet of the gas compressor is connected to a condenser 4-3; the condenser is connected with a scavenging manifold 4-4, an outlet of the scavenging manifold is connected to a scavenging port 3-1 in the internal combustion engine, and exhaust gas from the internal combustion engine is directed to the exhaust manifold. Exhaust gas at a rear end of the turbine is connected to the first bypass valve, and an outlet of the exhaust manifold and an inlet of the turbine are connected to an inlet of the second bypass valve in parallel. Or, the second bypass valve is arranged in a pipeline between the outlet of the exhaust manifold and the inlet of the turbine and connected with an intake port of the first control valve. The recirculated exhaust gas can be led out from the rear end of the turbine and can also be led out from a front end of the turbine through the bypass valves.

Gas from the exhaust gas recirculation system channel enters the injection system channel and is injected into an upper part of a cylinder through the injector in a stratified mode. Fresh air from the scavenging manifold enters through the scavenging port in a lower part of the cylinder.

The recirculated exhaust gas from the injector of the internal combustion engine and the fresh air entering from the scavenging port are subjected to concentration stratification. Temperature stratification can also be conducted on two kinds of the intake air.

Exhaust gas generated by the combustion of the internal combustion engine enters the exhaust manifold. Part of the exhaust gas enters the turbine to drive the gas compressor, and part of the recirculated exhaust gas is led out from the rear end of the turbine through the first bypass valve. Part of the recirculation exhaust gas can also be led out from the front end of the turbine through the second bypass valve. The pressure sensor is capable of detecting pressure changes in the pressure stabilizing tube, and the booster pump cooperates with the pressure sensor and the injector to accurately control the IEGR rate.

Figure 2:
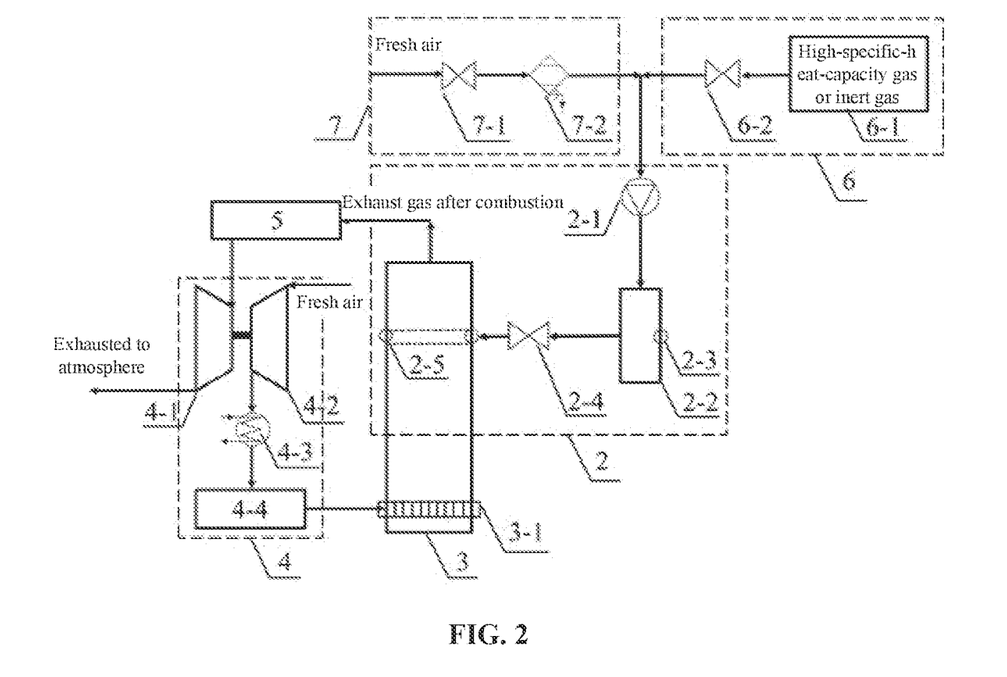
FIG. 2 is a principle and structural system diagram of all components of a stratified injection system device of high-specific-heat-capacity and inert gas.

(2) A stratified injection system device of high-specific-heat-capacity and inert gas for clean combustion of an internal combustion engine (as shown in FIG. 2) has the component structure that: the whole device is composed of four parts, wherein 1) a gas storage device 6-1 and a third control valve 6-2 are connected to form a high-specific-heat-capacity gas or inert gas channel 6; 2) a fourth control valve 7-1 and a water vapor collector 7-2 are connected to form a fresh air intake channel 7; 3) the injection system channel 2 is formed by sequentially connecting the booster pump 2-1, the pressure stabilizing tube 2-2, the pressure sensor 2-3, the second control valve 2-4 and the injector 2-5 in the internal combustion engine 3; and 4) in the structure of a power system 4, the outlet of the exhaust manifold 5 is connected to the inlet of a turbine 4-1; the turbine is coaxially connected with the gas compressor 4-2; the outlet of the gas compressor is connected to the condenser 4-3; the condenser is connected with the scavenging manifold 4-4; the outlet of the scavenging manifold is connected to the scavenging port 3-1; exhaust gas from the internal combustion engine is directed to the exhaust manifold; and exhaust gas at the rear end of the turbine is discharged into the atmosphere.

Exhaust gas generated by the combustion of the internal combustion engine enters the exhaust manifold, then enters the turbine to drive the gas compressor, and finally is discharged into the atmosphere from the rear end of the turbine. The pressure sensor can detect pressure changes in the pressure stabilizing tube, and the booster pump cooperates with the pressure sensor and the injector to accurately control the injection of high-specific-heat-capacity gas and inert gas.

The gas entering the booster pump can be the high-specific-heat-capacity gas, the inert gas, or fresh air from the water vapor collector, but only one of the three kinds of gas can be selected. One of the three kinds of gas is pressurized and then injected into the upper part of the cylinder through the injector in a stratified mode. The fresh air from the scavenging manifold enters through the scavenging port in the lower part of the cylinder.

The high-specific-heat-capacity gas is $CO_2$ or water vapor, and the inert gas is nitrogen or argon.

The gas from the high-specific-heat-capacity gas or inert gas channel and the fresh gas entering from the scavenging port can be subjected to component stratification, the in-cylinder swirl ratio can be improved, and the temperature stratification of mixed gas can be performed by injecting $CO_2$ and $H_2O$ steam so that the combustion performance is improved.

Figure 4:
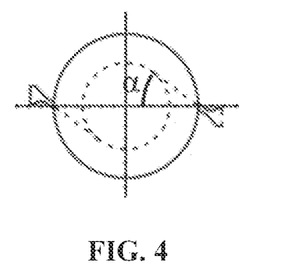
FIG. 4 is a schematic diagram of the one-layer arrangement of 2 injectors.
Figure 5:
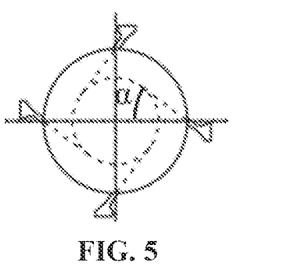
FIG. 5 is a schematic diagram of the one-layer arrangement of 4 injectors.
Figure 6:
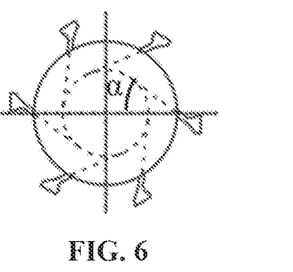
FIG. 6 is a schematic diagram of the one-layer arrangement of 6 injectors.
Figure 7:
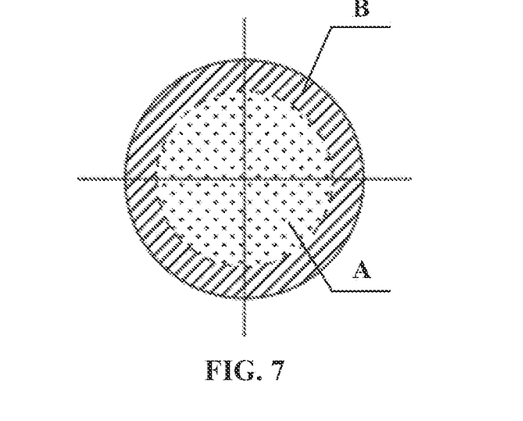
FIG. 7 is a structural diagram of an IEGR stratification embodiment in a combustion chamber of a marine diesel engine.

In the two stratified injection system devices, the position of the injector can be any position in the cylinder between a top dead center and a bottom dead center of a piston; 1-3 layers of the injectors can be arranged; 2-6 injectors can be arranged in each layer; and the injectors are uniformly distributed in the circumferential direction (as shown in FIG. 4, FIG. 5 and FIG. 6). The closer the arrangement position is to a cylinder head, the shorter the mixing time of the injected gas and the fresh intake gas is, the more obvious the stratification is, and the smaller the swirl ratio attenuation is.

In the two stratified injection system devices, the injection angle a of the injector can be selected in a range of 20° to 80°. The injected gas enters the cylinder under the guide role of a cylinder wall surface so that the in-cylinder swirl ratio is effectively increased.

SPECIFIC EMBODIMENT 1

Figure 3:
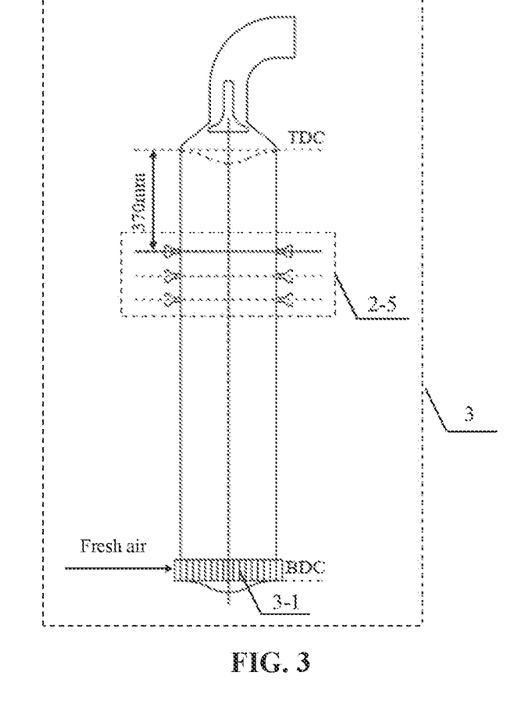
FIG. 3 is a schematic diagram of a structure and a mounting position of injectors in a combustion chamber of an internal combustion engine, a grid at a BDC part on the lower part of the figure is a scavenging port in a cylinder of the internal combustion engine, and intake gas comes from a scavenging manifold.

In this embodiment, the cylinder diameter of a low-speed two-stroke marine diesel engine is 340 mm, the rotating speed is 157 r/min (100% load), and the stroke is 1,600 mm. A first bypass valve is closed; a second bypass valve is opened; part of the exhaust gas enters a turbine drive power system; and recirculated exhaust gas accounting for 20% of the amount of fresh air that enters from a scavenging port is introduced into an IEGR channel system through the second bypass valve to be directly injected into the cylinder. A single-layer arrangement solution is adopted for injectors. Two injectors are evenly distributed in the circumferential direction, the injection angle α is 35°, and the exhaust gas injectors are located at the position 370 mm away from a compression top dead center (TDC) (as shown in FIG. 3).

Compared with an internal combustion engine without an IEGR technology, recirculated exhaust gas enters the cylinder under the guide role of the cylinder wall surface; the in-cylinder swirl ratio is effectively increased; the swirl ratio at the compression top dead center is increased to 13 from 3 of an original value; and the increased amplitude reaches 333%. The mixing rate and the combustion rate of fuel and air are greatly increased by increasing the swirl ratio; the peak heat release rate is increased by 7.94%; and the maximum combustion pressure is increased by 8.41%. In addition, fresh intake air and the injected recirculated exhaust gas in a combustion chamber close to the top dead center can achieve an ideal stratified state (as shown in FIG. 6). In FIG. 4, the fresh air is mainly in area A in the center of the cylinder, the recirculated exhaust gas is mainly in area B near a cylinder wall side, and the temperature of the area B at the compression top dead center is about 200 K lower than that of the area A. On the one hand, the recirculated exhaust gas is distributed near the wall surface of the cylinder so that a gas heat insulation layer can be effectively formed, and the heat transfer loss of the wall surface is reduced by 19.92%. On the other hand, the main generation area of nitrogen oxide is near the wall surface of the cylinder, so the generation of the nitrogen oxide can be effectively restrained through the distribution form of the recirculated exhaust gas near the wall surface of the cylinder. Finally, the generation amount of the nitrogen oxide is reduced to 2.9 g/kW·h from 10.1 g/kW·h (the internal combustion engine without the IEGR technology); the Tier III emission standards are met (the limit value in Tier III is 3.4 g/kW·h); the power is increased by 2.82%; and fuel consumption is reduced by 4.7 g/kW·h (for a container ship with the loading capacity of ten thousand containers, the fuel cost can be saved by about 7 million RMB each year).

SPECIFIC EMBODIMENT 2

In this embodiment, the cylinder diameter of a low-speed two-stroke marine diesel engine is 340 mm, the rotating speed is 157 r/min (100% load), and the stroke is 1,600 mm. A first bypass valve is closed; a second bypass valve is opened; part of exhaust gas enters a turbine drive power system; and recirculated exhaust gas accounting for 20% of the amount of fresh air that enters from a scavenging port is introduced into an IEGR channel system through the second bypass valve to be directly injected into the cylinder. A single-layer arrangement scheme is adopted in injectors; two injectors are evenly distributed in the circumferential direction; the injection angle a is 50°; and the exhaust gas injectors are located at the position 370 mm away from a compression top dead center (TDC) (as shown in FIG. 3).

Compared with an internal combustion engine without an IEGR technology, the swirl ratio at the compression top dead center is increased to 17 from 3 of an original value, the increased amplitude reaches 466%, and the peak heat release rate is increased by 9.32%, and the maximum combustion pressure is increased by 10.1%. Finally, the generation amount of nitrogen oxide is reduced to 3.15 g/kW·h from 10.1 g/kW·h (the internal combustion engine without the IEGR technology); the Tier III emission standards are met (the limit value in Tier III is 3.4 g/kW·h); the power is increased by 3.25%; and the fuel consumption is reduced by 5.42 g/kW·h.

SPECIFIC EMBODIMENT 3

In this embodiment, the cylinder diameter of a low-speed two-stroke marine diesel engine is 340 mm, the rotating speed is 157 r/min (100% load), and the stroke is 1,600 mm. A first bypass valve is closed; a second bypass valve is opened; part of the exhaust gas enters a turbine drive power system; and recirculated exhaust gas accounting for 20% of the amount of fresh air that enters from a scavenging port is introduced into an IEGR channel system through the second bypass valve to be directly injected into the cylinder. A single-layer arrangement scheme is adopted in injectors; two injectors are evenly distributed in the circumferential direction; the injection angle $\alpha$ is 65°; and the exhaust gas injectors are located at the position 370 mm away from a compression top dead center (TDC) (as shown in FIG. 3).

Compared with an internal combustion engine without an IEGR technology, the swirl ratio at the compression top dead center is increased to 20.5 from 3 of an original value, the increased amplitude reaches 583%, and the peak heat release rate is increased by 10.4%, and the maximum combustion pressure is increased by 10.9%. Finally, the generation amount of the nitrogen oxide is reduced to 3.37 g/kW·h from 10.1 g/kW·h (the internal combustion engine without the IEGR technology); the Tier III emission standards are met (the limit value in Tier III is 3.4 g/kW·h); the power is increased by 3.48%; and the fuel consumption is reduced by 5.8 g/kW·h.

SPECIFIC EMBODIMENT 4

In this embodiment, the cylinder diameter of a low-speed two-stroke marine diesel engine is 340 mm, the rotating speed is 157 r/min (100% load), and the stroke is 1,600 mm. Exhaust gas in an exhaust manifold enters a turbine drive power system; $CO_2$ accounting for 10% of the amount of fresh air that enters from a scavenging port is introduced into a high-specific-heat-capacity gas channel system through a third bypass valve to be directly injected into the cylinder. A single-layer arrangement scheme is adopted in injectors; two injectors are evenly distributed in the circumferential direction; the injection angle $\alpha$ is 35°; and the exhaust gas injectors are located at the position 370 mm away from a compression top dead center (TDC) (as shown in FIG. 3).

Compared with an internal combustion engine without a stratified injection technology for high-specific-heat-capacity gas, the swirl ratio at the compression top dead center is increased to 8 from 3 of an original value, and the increased amplitude reaches 167%, and the peak heat release rate is increased by 3.15%, and the maximum combustion pressure is increased by 3.4%. Finally, the generation amount of the nitrogen oxide is reduced to 3.24 g/kW·h from 10.1 g/kW·h (the internal combustion engine without the IEGR technology); the Tier III emission standards are met (the limit value in Tier III is 3.4 g/kW·h); the power is increased by 2.4%; and the fuel consumption is reduced by 4.0 g/kW·h.

SPECIFIC EMBODIMENT 5

In this embodiment, the cylinder diameter of a low-speed two-stroke marine diesel engine is 340 mm, the rotating speed is 157 r/min (100% load), and the stroke is 1,600 mm. Exhaust gas in an exhaust manifold enters a turbine drive power system; $N_2$ accounting for 20% of the amount of fresh air that enters from a scavenging port is introduced into an inert gas channel system through a third bypass valve to be directly injected into the cylinder. A single-layer arrangement scheme is adopted in injectors; the two injectors are evenly distributed in the circumferential direction; the injection angle $\alpha$ is 35°; and the exhaust gas injectors are located at the position 370 mm away from a compression top dead center (TDC) (as shown in FIG. 3).

Compared with an internal combustion engine without a stratified injection technology for inert gas, the swirl ratio at the compression top dead center is increased to 13 from 3 of an original value, the increased amplitude reaches 333%, and the peak heat release rate is increased by 8.5%, and the maximum combustion pressure is increased by 9.15%. Finally, the generation amount of the nitrogen oxide is reduced to 3.36 g/kW·h from 10.1 g/kW·h (the internal combustion engine without the IEGR technology); the Tier III emission standards are met (the limit value in Tier III is 3.4 g/kW·h); the power is increased by 3.05%; and the fuel consumption is reduced by 5.03 g/kW·h.

SPECIFIC EMBODIMENT 6

In this embodiment, the cylinder diameter of a low-speed two-stroke marine diesel engine is 340 mm, the rotating speed is 157 r/min (100% load), and the stroke is 1,600 mm. Exhaust gas in an exhaust manifold enters a turbine drive power system; fresh air accounting for 20% of the amount of fresh air that enters from a scavenging port is introduced into a fresh air channel system through a fourth bypass valve to be directly injected into the cylinder. A single-layer arrangement scheme is adopted in injectors; two injectors are evenly distributed in the circumferential direction; the injection angle α is 35°; and the exhaust gas injectors are located at the position 370 mm away from a compression top dead center (TDC) (as shown in FIG. 3).

Compared with an internal combustion engine without a stratified injection technology for fresh air, the swirl ratio at the compression top dead center is increased to 13.1 from 3 of an original value, the increased amplitude reaches 336%, and the peak heat release rate is increased by 10.6%, and the maximum combustion pressure is increased by 11.4%. Finally, the generation amount of nitrogen oxide is reduced to 3.7 g/kW·h from 10.1 g/kW·h (the internal combustion engine without the IEGR technology); the Tier III emission standards are met (the limit value in Tier III is 3.4 g/kW·h), but soot is reduced by 80%; the power is increased by 4.1%; and the fuel consumption is reduced by 6.83 g/kW·h.

We claim:

1. A system device for stratified injecting the recirculated exhaust gas for clean combustion of an internal combustion engine, comprising: a turbine, a gas compressor, control valves, an exhaust manifold, a scavenging manifold, an intercooler, an exhaust gas filter, a water vapor collector, a booster pump, a pressure stabilizing tube, a pressure sensor, an injector, bypass valves, a condenser and an internal combustion engine, wherein the internal combustion engine comprises a cylinder, fuel injectors and a scavenging port; the system device for stratified injecting the recirculated exhaust gas for clean of the internal combustion engine is composed of three parts, 1) an exhaust gas recirculation system channel, 2) an exhaust gas recirculation injection system channel and 3) a power system;
   wherein a first bypass valve, a first control valve, the intercooler, the exhaust gas filter and the water vapor collector are sequentially connected, and an outlet of a second bypass valve is connected between the first bypass valve and the first control valve in parallel to form an exhaust gas recirculation system channel;
   the exhaust gas recirculation injection system channel is formed by sequentially connecting the booster pump, the pressure stabilizing tube, the pressure sensor, a second control valve and the injector in the internal combustion engine;
   according to structure of the power system, an outlet of the exhaust manifold is connected to an inlet of the turbine, the turbine is coaxially connected with the gas compressor, and an outlet of the gas compressor is connected to the condenser; the condenser is connected with the scavenging manifold, and an outlet of the scavenging manifold is connected to the scavenging port in the internal combustion engine; exhaust gas from the internal combustion engine is directed to the exhaust manifold; part of the exhaust gas at a rear end of the turbine is discharged into the atmosphere, and part of the exhaust gas is connected to the first bypass valve; and the outlet of the exhaust manifold is connected to the inlet of the turbine in parallel and then connected to an inlet of the second bypass valve through a pipeline.

2. The system device for stratified injecting recirculated exhaust gas for clean combustion of the internal combustion engine according to claim 1, wherein the recirculated exhaust gas is led out from the rear end of the turbine and is led out from a front end of the turbine through the bypass valves.

3. The system device for stratified injecting recirculated exhaust gas for clean combustion of the internal combustion engine according to claim 1, wherein the recirculated exhaust gas injected by the injectors is injected into an upper part of the cylinder in a stratified mode, and fresh air from the scavenging manifold enters through the scavenging port in a lower part of the cylinder.

4. The system device for stratified injecting recirculated exhaust gas for clean combustion of the internal combustion engine according to claim 1, wherein the recirculated exhaust gas from the injectors of the internal combustion engine and the fresh air entering from the scavenging port are subjected to concentration stratification, and temperature stratification is conducted on two kinds of the intake air.

5. The system device for stratified injecting recirculated exhaust gas for clean combustion of the internal combustion engine according to claim 1, wherein the injectors are arranged at any position between a top dead center and a bottom dead center of a piston in a cylinder of the internal combustion engine; 1-3 layers of injectors is arranged; and 2-6 injectors is arranged on each layer, and evenly distributed circumferentially.

6. The system device for stratified injecting recirculated exhaust gas for clean combustion of the internal combustion engine according to claim 1, wherein an injection angle of the injectors is selected in a range of 20° to 80°.

7. A stratified injection system device of high-specific-heat-capacity and inert gas for clean combustion of an internal combustion engine, comprising: a gas storage device, control valves, a water vapor collector, a booster pump, a pressure stabilizing tube, a pressure sensor, an exhaust manifold, a turbine, a gas compressor, a condenser, a scavenging manifold, an exhaust manifold and an internal combustion engine, wherein the internal combustion engine comprises the cylinder, fuel injectors and a scavenging port; the stratified injection system device of high-specific-heat-capacity and inert gas for clean combustion of the internal combustion engine is composed of four parts, 1) a high-specific-heat-capacity gas of inert gas channel, 2) a fresh air intake channel, 3) an injection system channel and 4) a power system;
   wherein the gas storage device is connected with a third control valve to form a high-specific-heat- capacity gas or inert gas channel; a fourth control valve is connected with the water vapor collector to form a fresh air intake channel; an injection system channel is formed by sequentially connecting the booster pump, the pressure stabilizing tube, the pressure sensor, the second control valve and the injector in the internal combustion engine;
   where, the high-specific-heat-capacity gas of inert gas channel and the fresh air intake channel join together before they are connected to the booster pump;
   according to the structure of a power system, the outlet of the exhaust manifold is connected to the inlet of the turbine, the turbine is coaxially connected with the gas compressor, and the outlet of the gas compressor is connected to the condenser; the condenser is connected with the scavenging manifold; the outlet of the scavenging manifold is connected to the scavenging port in the internal combustion engine; exhaust gas from the internal combustion engine is directed to the exhaust manifold; and exhaust gas at the rear end of the turbine is discharged to the atmosphere.

8. The stratified injection system device of high-specific-heat-capacity and inert gas for clean combustion of the internal combustion engine according to claim 7, wherein the gas entering the booster pump is the high-specific-heat-capacity gas, the inert gas or fresh air from the water vapor collector; one of the three kinds of gas is pressurized and then injected into the upper part of the cylinder through the injectors in a stratified mode; and the fresh air from the scavenging manifold enters from the scavenging port in the lower part of the cylinder.

9. The stratified injection system device of high-specific-heat-capacity and inert gas for clean combustion of the internal combustion engine according to claim 7, wherein the gas from the high-specific-heat-capacity gas or inert gas channel and the fresh gas entering from the scavenging port are subjected to component stratification; and the temperature stratification of mixed gas is performed.

10. The stratified injection system device of high-specific-heat-capacity and inert gas for clean combustion of the internal combustion engine according to claim 7, wherein the high-specific-heat-capacity gas is $CO_2$ and water vapor and the inert gas is nitrogen or argon.

* * * * *